(12) United States Patent
Shearer et al.

(10) Patent No.: US 11,378,114 B2
(45) Date of Patent: Jul. 5, 2022

(54) QUICK DISCONNECT MOUNT

(71) Applicant: Taylor Made Group, LLC, Gloversville, NY (US)

(72) Inventors: Robert R. Shearer, Bradenton, FL (US); Donald A. Zirkelbach, Bradenton, FL (US); Charles Robert Withers, Parrish, FL (US)

(73) Assignee: Taylor Made Group, LLC, Gloversville, NY (US)

( * ) Notice: Subject to any disclaimer, the term of this patent is extended or adjusted under 35 U.S.C. 154(b) by 85 days.

(21) Appl. No.: 16/596,932

(22) Filed: Oct. 9, 2019

(65) Prior Publication Data

US 2020/0109729 A1    Apr. 9, 2020

Related U.S. Application Data

(60) Provisional application No. 62/743,009, filed on Oct. 9, 2018.

(51) Int. Cl.
*F16B 9/02* (2006.01)

(52) U.S. Cl.
CPC ..................... *F16B 9/02* (2013.01)

(58) Field of Classification Search
CPC .. F16B 9/02; F16B 21/065; F16B 9/07; F16B 21/16; F16B 9/09; B63B 2017/0054; B63B 17/02

USPC ............ 248/535; 403/1, 119, 359.3
See application file for complete search history.

(56) References Cited

U.S. PATENT DOCUMENTS

| | | | |
|---|---|---|---|
| 4,667,916 A * | 5/1987 | Richards | F16B 9/054 403/372 |
| 4,669,907 A * | 6/1987 | Patton | F16G 15/08 403/348 |
| 5,405,347 A * | 4/1995 | Lee | A61B 17/6416 403/53 |
| 5,472,007 A | 12/1995 | Malott | |
| 6,250,321 B1 | 6/2001 | Ernst | |
| 6,382,293 B1 | 5/2002 | Brockington et al. | |
| 8,132,583 B2 | 3/2012 | Mowatt, Sr. | |
| 8,528,578 B2 | 9/2013 | Mowatt, Sr. | |
| 8,616,511 B2 * | 12/2013 | James | F16C 11/045 248/500 |
| 9,187,922 B1 | 11/2015 | Phillips, Jr. | |
| 2002/0129465 A1 * | 9/2002 | Czipri | E05D 7/1055 16/367 |
| 2004/0206288 A1 * | 10/2004 | Wilcox | B63B 35/14 114/364 |

* cited by examiner

*Primary Examiner* — Muhammad Ijaz
(74) *Attorney, Agent, or Firm* — Nixon & Vanderhye P.C.

(57) ABSTRACT

A quick disconnect mount includes a mounting stud securable to a structure, and a connector securable on the mounting stud. The mounting stud includes at least one circumferential ridge and at least one circumferential trough, and the connector includes a central channel sized to fit over the mounting stud and a locking bar engageable with the circumferential trough.

16 Claims, 6 Drawing Sheets

QUICK DISCONNECT MOUNT

CROSS-REFERENCES TO RELATED APPLICATIONS

This application claims the benefit of U.S. Provisional Patent Application No. 62/743,009, filed Oct. 9, 2018, the entire content of which is herein incorporated by reference.

STATEMENT REGARDING FEDERALLY SPONSORED RESEARCH OR DEVELOPMENT (NOT APPLICABLE)

BACKGROUND

The invention relates to mounting structure for securing support poles or the like to a boat deck and, more particularly, to a low-profile mounting assembly utilizing push-click installation and press-button removal.

Existing mount systems typically utilize mounting brackets secured with two bolts and a locking pin securable through aligned holes in the bracket and support pole as shown in FIG. 1. FIG. 2 shows an alternative prior art construction utilizing a ball and socket joint. Both existing assemblies are highly conspicuous and secure the locking pins with unsightly lanyards as shown. Moreover, the existing constructions may not adequately secure the support poles, resulting in instability and potential rattling during use. The existing assemblies are also limited in rotatable displacement.

SUMMARY

It would be desirable to provide a quick disconnect mount utilizing a low-profile mounting stud and avoiding the use of unsightly pole pins with hanging lanyards. The quick disconnect mount of the described embodiments includes a low-profile mounting stud secured with a single connector to the boat deck. Connection and disconnection can be achieved with one person using one hand. Additionally, the low-profile mounting stud can be screwed or bolted to the surface using a single drill hole.

In an exemplary embodiment, a quick disconnect mount includes a mounting stud securable to a structure, and a connector securable on the mounting stud. The mounting stud includes at least one circumferential ridge and at least one circumferential trough, and the connector includes a central channel sized to fit over the mounting stud and a locking bar engageable with the circumferential trough.

The at least one circumferential ridge may define a cam surface. The locking bar may be displaceable between an extended position and a retracted position, where the locking bar may be biased toward the extended position. The cam surface defined by the at least one circumferential ridge may be positioned to displace the locking bar from the extended position to the retracted position as the connector is positioned over the mounting stud. The quick disconnect mount may further include a pushbutton cooperable with the locking bar that when depressed displaces the locking bar from the extended position to the retracted position.

The connector may include an interior circumferential seal. The connector may include a pair of upright posts extending away from the mounting stud that define a U-shaped channel. The connector further may include a bushing positioned in the U-shaped channel. The connector may be rotatable on the mounting stud across 360 degrees.

The mounting stud may include a single through hole, and the quick disconnect mount may further include a single connector extendable through the single through hole.

In another exemplary embodiment, a support pole assembly includes a support pole with a connecting end, and the quick disconnect mount of the described embodiments. The connecting end of the support pole is attached to the connector. The connector may include a pair of upright posts extending away from the mounting stud that define a U-shaped channel, where the connecting end of the support pole is secured in the U-shaped channel. In some embodiments, the support pole is pivotable relative to the connector across at least 180 degrees, and the connector is rotatable on the mounting stud across 360 degrees. The connector may also include a bushing positioned in the U-shaped channel, where the connecting end of the support pole engages the bushing.

In yet another exemplary embodiment, a method of connecting a support pole to a boat deck using the quick disconnect mount of the described embodiments includes the steps of securing the support pole to the connector; aligning the connector with the mounting stud; positioning the connector over the mounting stud to a first position such that the circumferential ridge displaces the locking bar from an extended position to a retracted position; and positioning the connector over the mounting stud to a second position such that the locking bar is displaced into the extended position engaging the circumferential trough.

BRIEF DESCRIPTION OF THE DRAWINGS

These and other aspects and advantages will be described in detail with reference to the accompanying drawings, in which.

DETAILED DESCRIPTION

Figure 1:
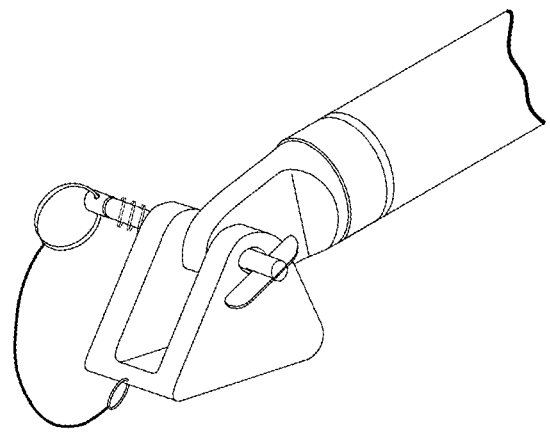
FIG. 1 shows an existing mount system utilizing a mounting bracket secured with two bolts and a locking pin.
Figure 2:
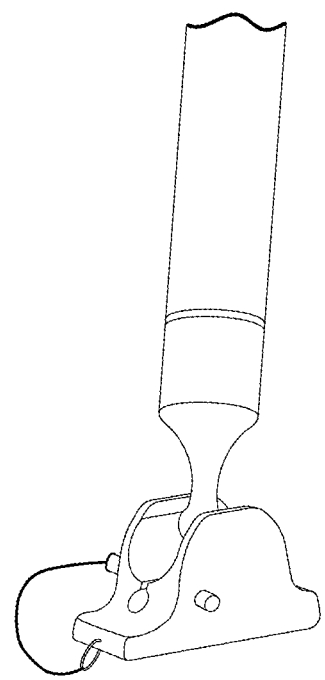
FIG. 2 shows an alternative existing construction utilizing a ball and socket joint.
Figure 3:
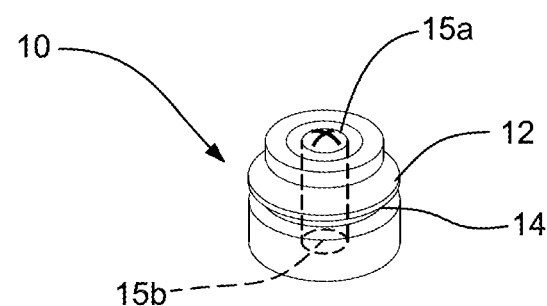
FIG. 3 shows the low-profile mounting stud of the quick disconnect mount according to the described embodiments.
Figure 4:
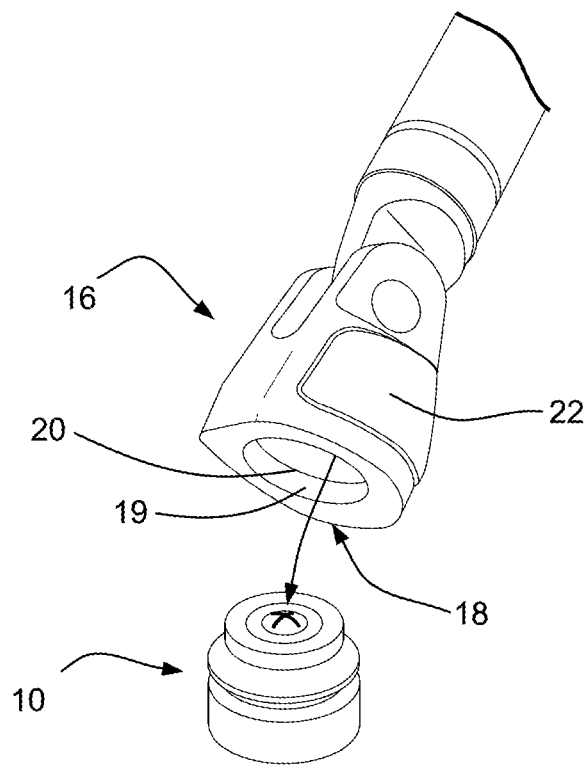
FIGS. 4 and 5 show the connector of the quick disconnect mount in position to engage the mounting stud.
Figure 5:
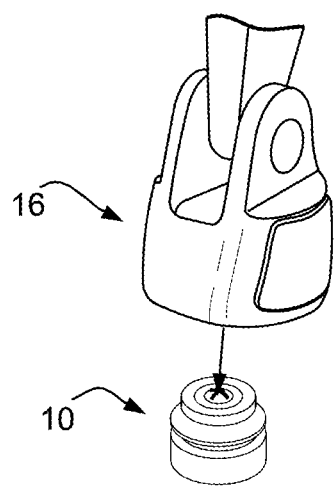

With reference to FIGS. 3-6, the quick disconnect mount of the described embodiments includes a low-profile mounting stud 10 securable to a boat deck or other structure. That is, the mounting stud 10 can be screwed or bolted to the structure via a single connector 15A extendable through a single through hole 15B. The mounting stud 10 includes at least one circumferential ridge 12 and at least one circumferential trough 14.

The connector 16 includes a central channel 18 sized to fit over the mounting stud 10. A seal 19 or the like may be positioned in the channel 18. Locking structure 20 (described in more detail below) in the channel is coupled with a pushbutton 22 for engaging the trough 14 over the ridge 12 of the mounting stud 10.

Figure 10:
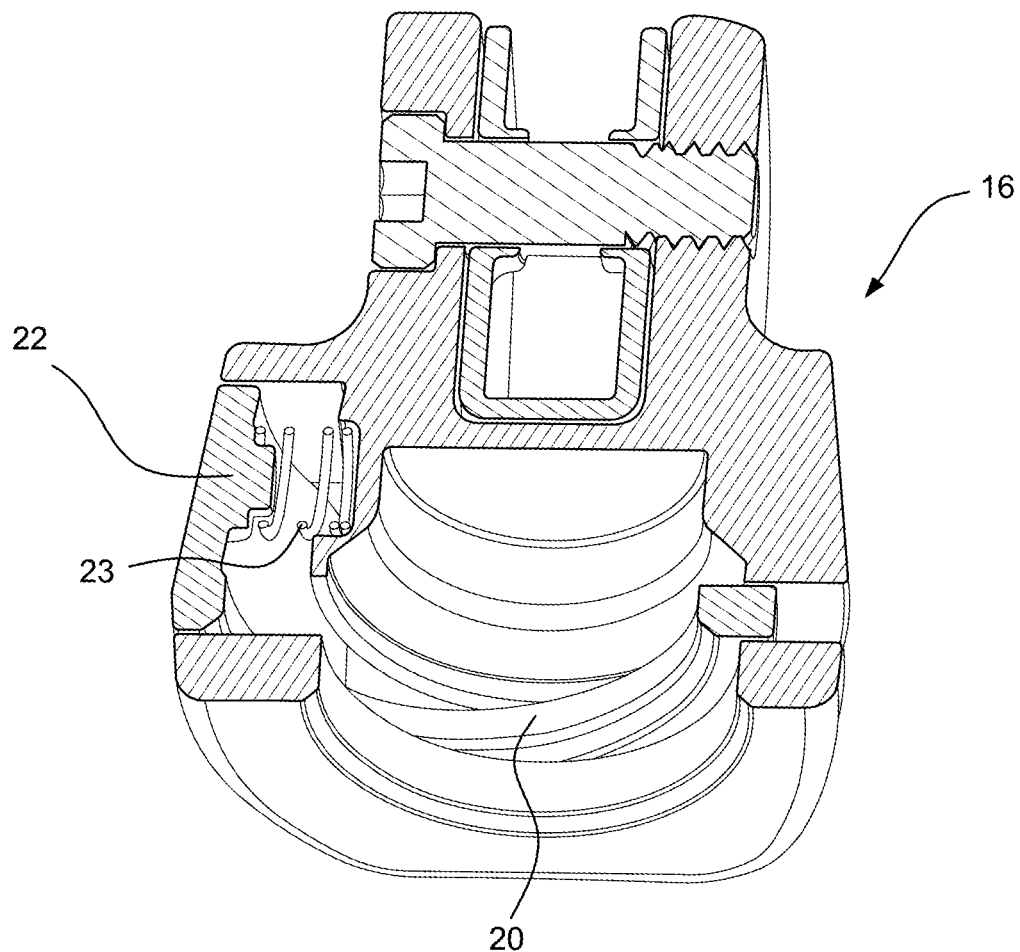
FIG. 10 is a sectional view of the connector.

FIG. 10 is a sectional view of the connector 16. The locking structure includes a locking bar 20 that is displaceable between an extended position and a retracted position.

The locking bar 20 is biased toward the extended position via a spring 23 or the like engaging the pushbutton 22. The locking bar 20 is integral with the pushbutton 22, and as such, displacing the pushbutton 22 against the force of the spring 23 serves to displace the locking bar 20 out of engagement with the trough 14 of the mounting stud 10. The circumferential ridge 12 of the mounting stud 10 defines a cam surface. The cam surface defined by the circumferential ridge 12 is positioned to displace the locking bar 20 from the extended position to the retracted position as the connector 16 is positioned over the mounting stud 10. In an alternative construction, the locking bar 20 may include a cam surface.

To secure the connecting member 16, the channel 18 is aligned with the mounting stud 10, and the connector 16 is simply pressed onto the mounting stud 10. As noted, the ridge 12 acts as a cam surface to displace the locking structure/bar 20 as the connector 16 is pressed onto the pin 10. See FIGS. 4-5.

Figure 6:
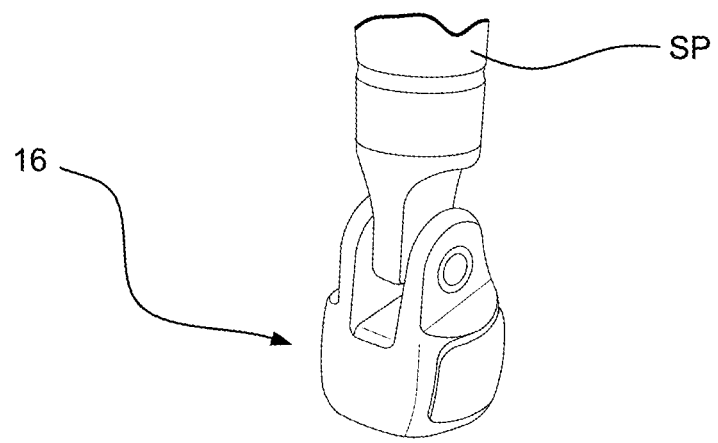
FIGS. 6-8 show the connector engaging the mounting stud.

The connector 16 is shown secured to the mounting stud 10 in FIG. 6. Once secured, the support pole SP is displaceable across greater than 180°, and the connector 16 and support pole SP are 360° rotatable around the mounting stud 10. The added degrees of freedom facilitate installation of a Bimini top or other structure supported on one or more of the support poles SP.

Figure 7:
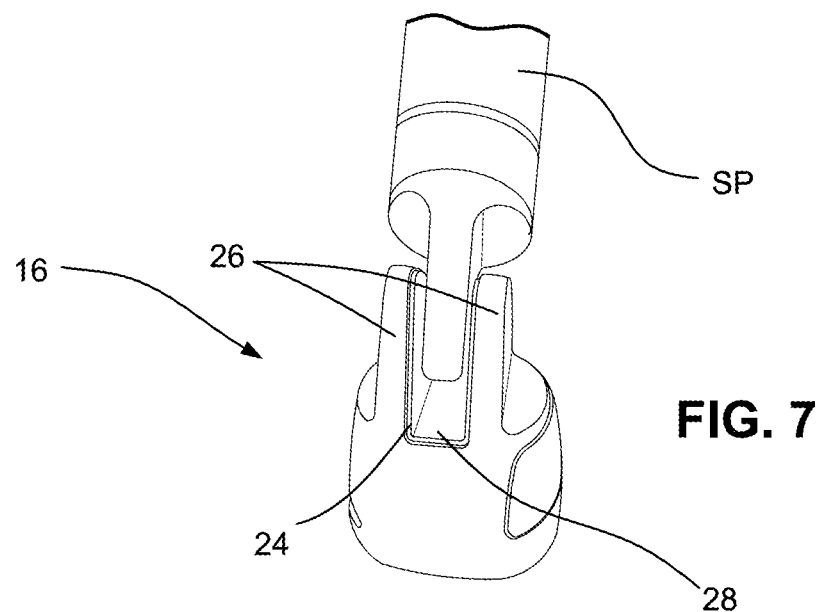
Figure 8:
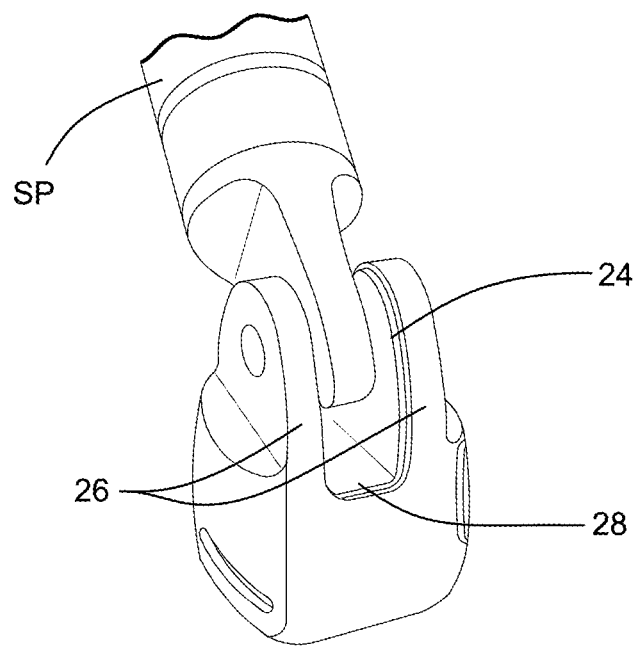

With reference to FIGS. 7 and 8, in some embodiments, the connector 16 may be provided with a bushing 24 formed of plastic or other pliable material. The connector 16 may be provided with a pair of upright posts 26 extending away from the mounting stud 10. The upright posts 26 define a U-shaped channel 28. The bushing 24 may be positioned in the U-shaped channel 28. The bushing 24 secures the end of the support pole SP, possibly but not necessarily in an interference fit, to provide for a secure connection and to substantially reduce or eliminate rattling during use.

Figure 9:
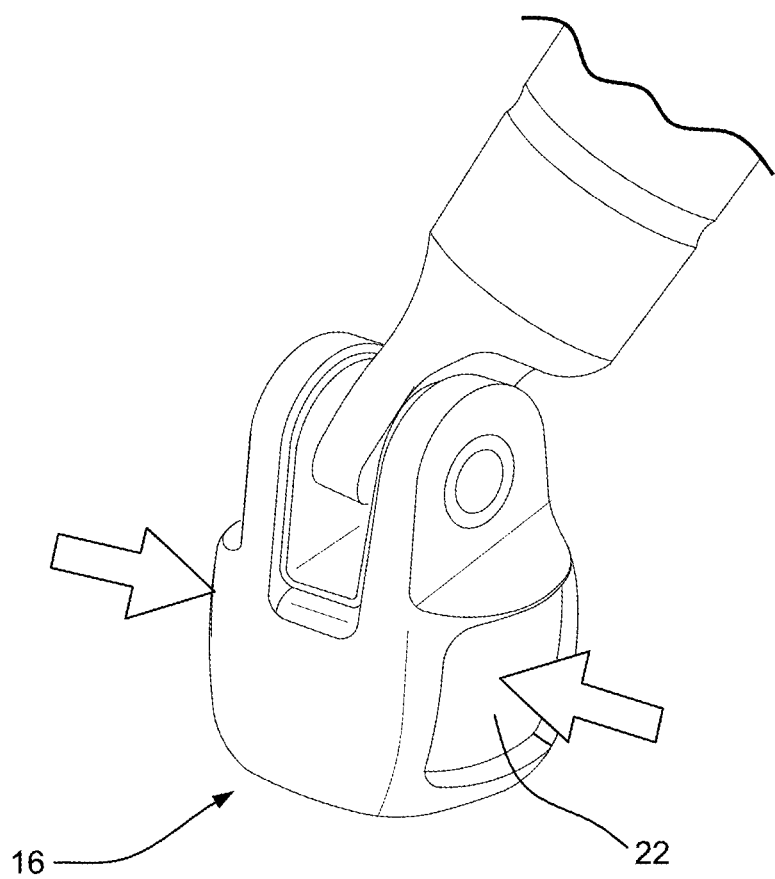
FIG. 9 shows the pushbutton pressed inward to disengage the connector.

With reference to FIG. 9, removal of the connector 16 from mounting stud 10 is achieved by depressing the button 22 to displace/retract the locking bar 20 from the mounting stud trough 14, and the connector 16 can be simply lifted off the mounting stud 10.

With the structure of the described embodiments, when the poles are removed, all that is left is a small low-profile mounting stud. This structure avoids the use of unsightly pole pins with hanging lanyards. Connection and disconnection can be achieved with one person using one hand. The connectors can be secured anywhere the mounting stud can be attached including pontoon rails, fiberglass boat decks, and the like. The 360° swivel facilitates installation, and the greater than 180° of angular displacement can accommodate any angle of the support pole going into the mount. The mounting stud can be screwed or bolted to the surface using a single drill hole. The connector may be formed using various materials, and the bushing may be a polymer sleeve.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A quick disconnect mount comprising:
    a mounting stud securable to a structure, the mounting stud including at least one circumferential ridge and at least one circumferential trough;
    a connector securable on the mounting stud, the connector including a central channel sized to fit over the mounting stud and a locking bar engageable with the circumferential trough, wherein the locking bar is displaceable between an extended position and a retracted position; and
    a pushbutton cooperable with the locking bar, the pushbutton when depressed displacing the locking bar from the extended position to the retracted position.

2. The quick disconnect mount according to claim 1, wherein the at least one circumferential ridge defines a cam surface.

3. The quick disconnect mount according to claim 2, wherein the locking bar is biased toward the extended position, and wherein the cam surface defined by the at least one circumferential ridge is positioned to displace the locking bar from the extended position to the retracted position as the connector is positioned over the mounting stud.

4. The quick disconnect mount according to claim 1, wherein the locking bar is biased toward the extended position by a spring.

5. The quick disconnect mount according to claim 1, wherein the connector comprises an interior circumferential seal.

6. The quick disconnect mount according to claim 1, wherein the connector comprises a pair of upright posts extending away from the mounting stud, the upright posts defining a U-shaped channel.

7. The quick disconnect mount according to claim 6, wherein the connector further comprises a bushing positioned in the U-shaped channel.

8. The quick disconnect mount according to claim 1, wherein the connector is rotatable on the mounting stud across 360 degrees.

9. The quick disconnect mount according to claim 1, wherein the mounting stud comprises a single through hole, and wherein the quick disconnect mount further comprises a single connector extendable through the single through hole.

10. A support pole assembly comprising:
    a support pole with a connecting end; and
    a quick disconnect mount fixable to a structure and securing the support pole, the quick disconnect mount including:
        a mounting stud securable to the structure, the mounting stud including at least one circumferential ridge and at least one circumferential trough,
        a connector securable on the mounting stud, the connector including a central channel sized to fit over the mounting stud and a locking bar engageable with the circumferential trough, wherein the locking bar is displaceable between an extended position and a retracted position, and
        a pushbutton cooperable with the locking bar, the pushbutton when depressed displacing the locking bar from the extended position to the retracted position,
    wherein the connecting end of the support pole is attached to the connector.

11. The support pole assembly according to claim 10, wherein the connector comprises a pair of upright posts extending away from the mounting stud, the upright posts defining a U-shaped channel, and wherein the connecting end of the support pole is secured in the U-shaped channel.

12. The support pole assembly according to claim 11, wherein the support pole is pivotable relative to the connector across at least 180 degrees, and wherein the connector is rotatable on the mounting stud across 360 degrees.

13. The support pole assembly according to claim 11, wherein the connector further comprises a bushing positioned in the U-shaped channel, and wherein the connecting end of the support pole engages the bushing.

14. The support pole assembly according to claim 10, wherein the at least one circumferential ridge defines a cam surface.

15. The support pole assembly according to claim 14, wherein the locking bar is biased toward the extended position, and wherein the cam surface defined by the at least one circumferential ridge is positioned to displace the locking bar from the extended position to the retracted position as the connector is positioned over the mounting stud.

16. A quick disconnect mount comprising:
   a mounting stud securable to a structure, the mounting stud including at least one circumferential ridge and at least one circumferential trough; and
   a connector securable on the mounting stud, the connector including a central channel sized to fit over the mounting stud and a circumferential locking bar, wherein the circumferential locking bar is shaped to conform to the circumferential trough and is engageable with the circumferential trough such that the circumferential locking bar at least partially surrounds the mounting stud.

\* \* \* \* \*